United States Patent [19]

McCreary et al.

[11] 3,962,507

[45] June 8, 1976

[54] VINYL STRUCTURE HAVING AN EMBOSSED TOP LAYER AND A FOAM BASE

[75] Inventors: Willard E. McCreary, Lancaster; Elvin M. Weidman, Willow Street, both of Pa.

[73] Assignee: Armstrong Cork Company, Lancaster, Pa.

[22] Filed: Dec. 16, 1974

[21] Appl. No.: 532,840

Related U.S. Application Data

[62] Division of Ser. No. 312,813, Dec. 7, 1972, Pat. No. 3,887,409.

[52] U.S. Cl............................... 428/159; 428/161; 428/315
[51] Int. Cl.² ............................................ B32B 3/26
[58] Field of Search ........... 428/156, 158, 159, 160, 428/161, 315, 212; 264/45.1, 48, 321, 54, DIG. 60, 234, 327, 463; 427/264, 270, 278, 412; 156/79, 220, 78, 209, 219, 282

[56] References Cited
UNITED STATES PATENTS

| | | | |
|---|---|---|---|
| 2,878,153 | 3/1959 | Hacklander............................ | 156/78 |
| 3,196,030 | 7/1965 | Petry..................................... | 427/264 |
| 3,196,062 | 7/1965 | Kristal................................... | 156/79 |
| 3,293,108 | 12/1966 | Main et al............................. | 428/159 |
| 3,305,419 | 2/1967 | Voelker................................. | 156/209 |
| 3,399,106 | 8/1968 | Palmes et al......................... | 428/159 |

*Primary Examiner*—William J. Van Balen
*Assistant Examiner*—Stanley S. Silverman

[57] ABSTRACT

A vinyl structure is made by a specific technique which yields an embossed top layer and a foam base. The embossed top layer is made of a material which fuses and which is embossable at a lower temperature than the base foam. After the two layers are formed, the product is heated to a point which will soften the top layer, but not the foam base and consequently embossing will affect only the top layer.

2 Claims, 1 Drawing Figure

U.S. Patent  June 8, 1976  3,962,507
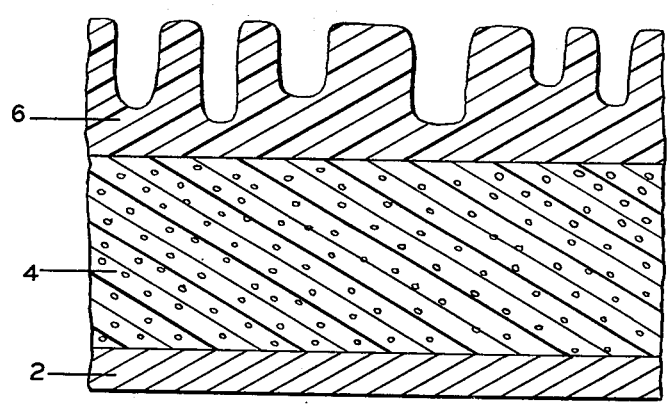

VINYL STRUCTURE HAVING AN EMBOSSED TOP LAYER AND A FOAM BASE

CROSS-REFERENCE TO RELATED APPLICATION

This is a division, of application Ser. No. 312,813, filed Dec. 7, 1972 now U.S. Pat. No. 3,887,409.

BACKGROUND OF THE INVENTION

1. Field of the Invention

The invention herein is directed to an embossed product and the process of making the product. More particularly, it is directed to a product which has an embossed top layer structure and a base foam layer which has been unaffected by the embossing operation.

2. Description of the Prior Art

In the floor covering art, it is common practice to make a floor covering material with a foam backing and an embossed wear layer or top layer. U.S. Pat. No. 3,196,062, is typical of the techniques utilized to form the above-mentioned product. A backing or a fabric has placed thereon a foamable thermoplastic resin material and then over that is placed a second thermoplastic resin. The product is subjected to heat and the foamable thermoplastic material is foamed. The thermoplastic resin is normally a nonfoamable material and it is simply fused by the heat. While the total product is still hot, it is then fed to embossing rolls which emboss a pattern in the upper surface of the product. Normally, the embossing penetrates into the foam layer in that the foam layer receives some deformation as a result of the embossing of the top thermoplastic resin layer.

It is the purpose of the invention herein to provide a product and technique for making the same wherein the embossing is done to the top layer without any impression being transmitted into the foam backing. Without the impression being transmitted into the foam backing, the foam backing will thus be undamaged by the embossing.

SUMMARY OF THE INVENTION

It is desired to deeply emboss the top layer of a vinyl structure containing a foam base without the undue crushing or deformation of the foam base. In the inventive process herein, a bottom foamable material layer is metered onto a carrier. On top of this is placed a layer of embossable vinyl material. Layers are fully fused and/or foamed together and cooled. The top layer is then reheated to fusion by top heat and embossed. The top embossable layer is formulated so that it reaches full fusion at a significantly lower temperature than the fusion temperature of the bottom foam layer since the top layer is readily embossed with no or little collapse or overblowing of the bottom foam layer.

BRIEF DESCRIPTION OF THE DRAWING

The drawing herein is a cross-sectional view of the product of the invention herein.

DESCRIPTION OF THE PREFERRED EMBODIMENT

Referring to the FIGURE, there is shown the product formed by the inventive process herein. The product shown happens to be a floor covering material. This structure is provided with a backing 2 which would normally be kept with the flooring when it is installed in a home. The product could be used for some purposes other than flooring. It is possible that it could be made without the backing 2. Under such circumstances, the product would be formed wherein the backing would be utilized as a carrier or a separate carrier would be utilized during the manufacturing process. After the product is made, the temporary backing or carrier would be stripped from the finished product.

The main parts of the invention structure herein are the foam backing layer 4 and the embossable layer 6. The foam backing layer 4 is a conventional foamable thermoplastic resin. It could be the thermoplastic resin set forth in the above-mentioned U.S. Pat. No. 3,196,062, or any other conventional type foamable material.

The embossable layer 6 may be either a foamable or nonfoamable thermoplastic resin. Herein in the example, the material may be similar to that set forth in above-mentioned U.S. Pat. No. 3,196,062. However, the critical difference between layer 4 and layer 6 is that layer 6 must be formed of a material which fuses and is embossable at a lower temperature than that of layer 4. Consequently, during a subsequent reheating operation when heat is applied on only the layer 6, this layer will heat to a temperature where it may be readily embossed, while the layer 4 has not yet reached a temperature where it can be considered soft enough for embossing or be heated to a temperature where it is overblown. That is, it is heated to a point where the blowing agent has caused the foam material to form and then is heated even further so that the foamed thermoplastic material is caused to collapse from the heat.

The inventive technique for making the above product is almost the same as that set forth in the above-mentioned U.S. Pat. No. 3,196,062. A backing or carrier 2 receives first the foamable thermoplastic resin. Over top of this is placed either a foamable or nonfoamable embossable thermoplastic resin which fuses at a lower temperature than the layer 4. Both layers are then subjected to heat so that both products are heated to their full fusion temperature. If both products are foamable, both products are heated to the point that both have foamed. The product is then cooled. The product is then reheated from the top surface only and it is heated only to the point necessary to soften the top layer so that it may be embossed. The product is then embossed. Since the foam back layer 4 has not been heated to its fusion temperature, it will maintain its resiliency and even though temporarily deformed during the actual embossing stage, it will not be permanently deformed by having the embossing temperature collapse the foam structure of layer 4. The product is then permitted to cool and is then available for use as a flooring.

In one specific embodiment of the invention which has been utilized, the foam back layer 4 has been formed from the following formulation:

|  | Parts by Weight |
| --- | --- |
| Polyvinyl chloride resin - PVC 450 - Diamond Shamrock | 100 |
| Dioctyl phthalate plasticizer | 70 |
| Epoxidized soybean oil - Admex 710 - Ashland Oil Co. | 5 |
| Calcium zinc liquid soap - Ferro 95V1 - Ferro Chemical Co. | 4 |
| Limestone | 10 |
| Silica (hydrated) | 0.75 |
| Titanium dioxide | 2.21 |
| Azodicarbonamide - Kempore 60 - National | 2.25 |

-continued

| | Parts by Weight |
|---|---|
| Polychemicals Inc. | |

The embossable top layer has been formed from the following formulation:

| | Parts by Weight | |
|---|---|---|
| | Foamable | Nonfoamable |
| Polyvinyl chloride resin - Exon 965 - Firestone | 100 | 100 |
| Di 2-ethyl hexyl phthalate plasticizer | 50 | 50 |
| Epoxidized soybean oil - Admex 710 - Ashland Oil Co. | 5 | 5 |
| Calcium zinc liquid soap - Ferro 95V1 - Ferro Chemical Co. | 5 | — |
| Barium, cadmium, phosphite liquid soap - Ferro 5245 - Ferro Chemical Co. | — | 5 |
| Titanium dioxide | 4.0 | 5.0 |
| Silica (hydrated) | 1.25 | 1.0 |
| Azodicarbonamide - Kempore 60 - National Polychemicals Inc. | 2.25 | — |

The top layer is fusible at a temperature of about 300° F. whereas the foamable layer will foam and is fused at a temperature of about 400° F. Just prior to the embossing operation, the product is top heated to a temperature of about 290° F. for embossing. This temperature will be low enough so that the foam backing layer 4 is not heated to its fusion temperature.

What is claimed is:

1. A vinyl structure which is composed of a foam back structure and an embossable top layer, both said foam back structure and said embossable top layer being formed of substantially the same composition of material, said embossable top layer being embossed and those regions of the foam backing which are directly below the deeply embossed portions of the embossed top layer being undamaged and without any foam cell structure collapse, said undamaged condition of the foam backing resulting from the fact that the top layer is formed from a plastisol resin which has a lower fusing temperature than the plastisol resin forming the foam backing, said top layer plastisol resin having a fusing temperature which is about 300°F. and said foam backing having a fusing temperature which is about 100°F. above the fusing temperature of the top layer plastisol resin.

2. The structure of claim 1 wherein the top layer is also a foamable thermoplastic resin.

* * * * *